INVENTOR.
HAN-MIN HUNG
BY Alfred W. Barber
ATTORNEY

INVENTOR.
HAN-MIN HUNG
BY
Alfred W. Barber
ATTORNEY

May 14, 1968

HAN-MIN HUNG 3,383,579

INPUT REGULATED POWER SUPPLIES

Filed April 19, 1966

INVENTOR.
HAN-MIN HUNG
BY
Alfred W. Barber
ATTORNEY

INVENTOR.
HAN-MIN HUNG
BY
*Alfred W. Barber*
ATTORNEY

United States Patent Office 3,383,579
Patented May 14, 1968

3,383,579
INPUT REGULATED POWER SUPPLIES
Han-Min Hung, Bayside, N.Y., assignor to Forbro
Design Corp., New York, N.Y., a corporation of
New York
Filed Apr. 19, 1966, Ser. No. 543,627
7 Claims. (Cl. 321—11)

The present invention concerns regulated power supplies and, in particular, AC to DC regulated power supplies employing silicon controlled rectifiers (SCR) between the incoming AC line and the voltage changing power transformer.

Regulated power supplies of the type with which the present invention is concerned are intended for connection to an alternating current power line and produce voltage/current regulated direct current output.

Such power supplies generally include an input power transformer for transforming the line voltage to a suitable voltage for the particular power supply, rectifiers for transforming the alternating current to direct current, a filter for reducing ripple of the direct current, and control means for regulating the output voltage or current or both. A device which has been found to be useful as a control device in regulated power supplies is the silicon controlled rectifier which acts as a switch when supplied with a suitable pulse. Thus, the silicon controlled rectifier is used as a control device by controlling it in accordance with the variation of the output voltage or current from a preset value. The silicon controlled rectifier is generally used as a part of the rectifying system which converts the alternating current to direct current.

The silicon controlled rectifier can be used in another way in a regulated power supply and this is to place two such rectifiers between the power line and the input power transformer. By using two silicon controlled rectifiers back-to-back both halves of the alternating current from the power line can be controlled. Control of the final direct current output is provided by controlling the on time of the silicon controlled rectifiers. The present invention is concerned with improved methods of and means for controlling the silicon controlled rectifiers together with improved over-voltage and over-temperature protective circuits.

In accordance with the present invention, alternating current input from a power line is fed through a circuit breaker to two back-to-back connected silicon controlled rectifiers, through an input power transformer, rectifiers, filter and current sensing resistor to the direct current output terminals. The silicon controlled rectifiers are fired by means of pulses generated by a saturable reactor pulse generator which includes novel circuitry to insure proper firing of the silicon controlled rectifiers which is especially important in the present system where the silicon controlled rectifiers are connected to the power line. The pulse generator is in turn controlled by synchronous signals from a phase shifter controlled by amplified error signals. A novel fast discharge circuit provides improved phase shifter operation and takes part in the short circuit protection of the system. The error signals which carry the information as to whether the output is higher or lower than its preset value are generated in two comparator circuits, one for voltage regulation and the other for current regulation and after independent amplification are applied to an OR gate. In the OR gate the larger of the two amplified error signals is selected and passed on to an additional amplifier which drives the phase shifter through a suitable lag network.

Accordingly it is one object of the present invention to provide improved methods of and means for regulating the output voltage or current of an AC to DC power supply in a system including silicon controlled rectifiers connected between the alternating current power source and an input power transformer.

Another object is to provide improved firing circuits for the silicon controlled rectifiers in such a system.

Still another object is to provide improved safety devices including short circuit protection, over-voltage and over-temperature protection means in such a system.

Still another object is to provide improved voltage and current regulation with automatic crossover in such a system.

These and other objects of the present invention will be apparent from the detailed description of the invention given in connection with the various figures of the drawing.

Figure 1:
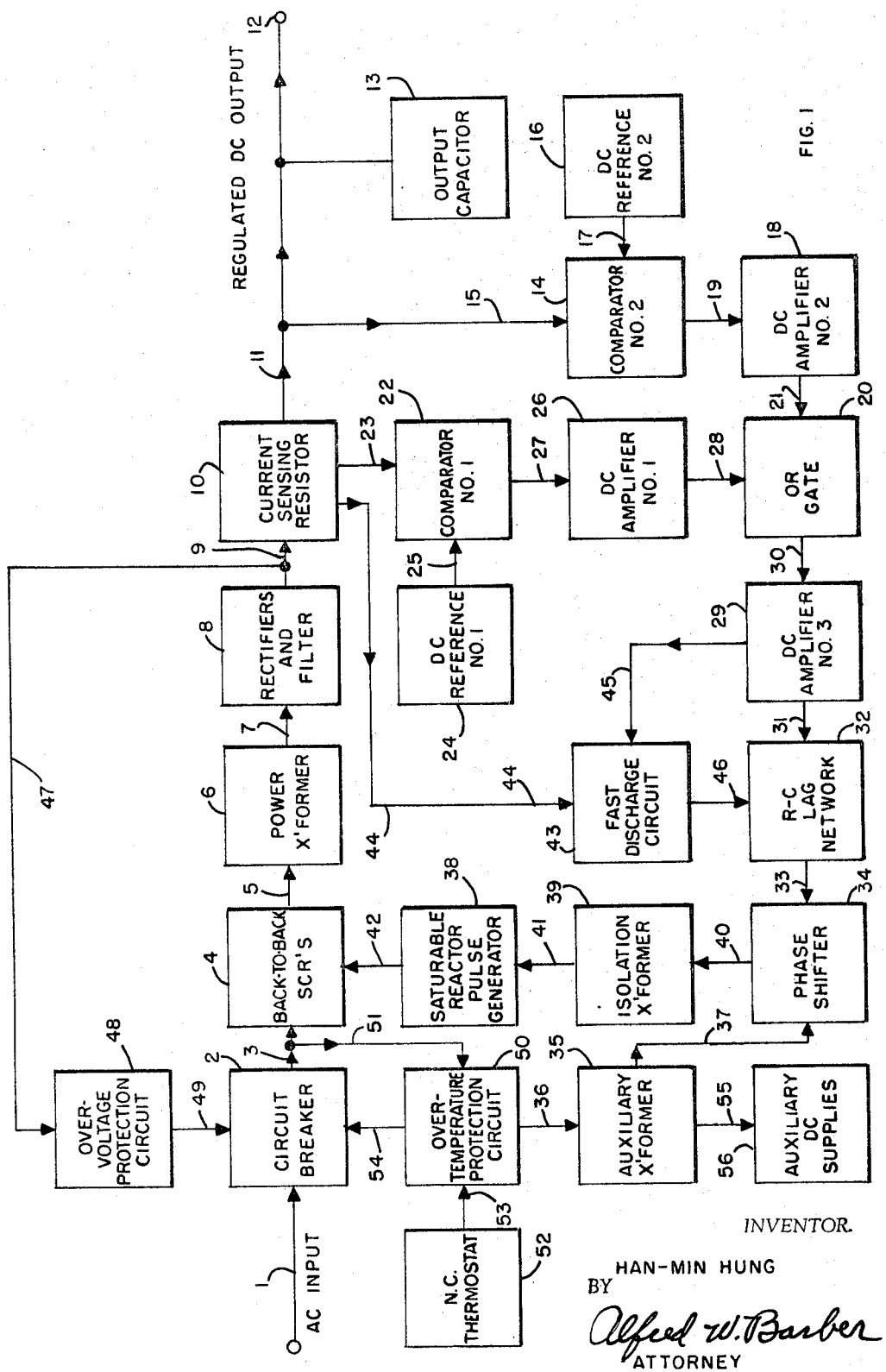
FIGURE 1 is a block diagram of one form of the present invention.

The invention will now be described in broad terms following the block diagram of FIGURE 1. (Detailed description of the circuit details and operation will be given below in connection with the remaining figures of the drawing.) The AC input is derived over line 1 and passing through circuit breaker 2 proceeds over line 3 to the back-to-back silicon controlled rectifiers (SCR's) 4. The AC controlled by the SCR's 4 is applied to the power transformer 6 over line 5. The power transformer 6 is used to change the input power line voltage to whatever voltage is required in view of the desired DC output voltage. The transformed AC voltage is then applied over line 7 to the rectifiers and filter 8 thereby providing the desired DC voltage for the output. The filtered DC passes over line 9 to current sensing resistor 10 and then over line 11 to output terminal 12 to which is connected output capacitor 13.

This power supply includes two regulating circuits, one for voltage and the other for current with automatic crossover. The voltage regulating circuit includes comparator 14 connected to the output line 11 over line 15. Comparator 14 is connected to DC reference 16 over line 17 and generates an error signal which is applied to DC amplifier 18 over line 19. The amplified error signal is applied to OR gate 20 over line 21. The OR gate determines whether the control of the power supply is to be voltage mode or current mode. The current regulating circuit starts with current sensing resistor 10 across which there is developed a voltage proportional to the current being drawn from the power supply. The voltage drop across the current sensing resistor is applied to comparator 22 over line 23 and is compared thereby with a reference voltage from DC reference 24 connected over line 25. The error voltage resulting from this comparison is amplified by DC amplifier 26 connected over line 27 and this amplified error signal is applied to OR gate 20 over line 28. As stated above, the OR gate selects the predominant signal of the two amplified error signals (voltage or current) and eliminates the other. The selected error signal passes on to DC amplifier 29 over line 30. Thus, selected and further amplified error signal is passed over lead 31 to R-C lag network 32 and then on over line 33 to phase shifter 34. Phase shifter 34 operates in accordance with the applied amplified error signal to shift the phase of line frequency signals from auxiliary transformer 35 over line 37 and derived from the input line 1 over line 36. The phase shifted signals from phase shifter 34 are applied to saturable reactor pulse generator 38 through isolation transformer 39 and over lines 40 and 41. Saturable reactor pulse generator 38 generates pulses under control of the phase shifted line frequency signals from phase shifter 34 which are in turn controlled by error signals passed by OR gate 20. These controlled pulses from pulse generator 38 are utilized to fire the SCR's 4 over line 42 and thereby to control the input power to the power supply and hence the output voltage or current at output terminal 12.

In addition to the basic operation of the voltage/current regulation described above there are a number of additional improvements shown in the block diagram of FIGURE 1. One of these is the fast discharge circuit 43 which receives signals from current sensing resistor 10 over line 44 and from amplifier 29 and serves to speed the response of the system through its connection to lag network 32 over line 46. This speed up action is particularly effective in providing faster transient response which is otherwise slow due to the necessarily slow response provided by the lag network which is required for stability reasons.

Other improvements include over-voltage and over-temperature protection both of which provisions operate on circuit breaker 2. The over-voltage protection circuit 48 is connected to DC voltage line 9 over line 47 and operates to open circuit breaker 2 in response to over-voltage conditions through line 49. The over-temperature protection circuit 50 acts as a link relaying AC power from line 3 over line 51 and through line 36 to auxiliary transformer 35 so that when over-temperature conditions are sensed by thermostat 52 connected over line 53, the auxiliary power is interrupted and no firing pulses are generated or passed on to the SCR's. The over-temperature protection circuit 50 is also coupled to circuit breaker 2 over line 54 and serves to open the circuit breaker as well when over-temperature conditions are sensed by thermostat 52. This thermostat 52 is located at a point where temperature rise above a predetermined point indicate an unsafe operating condition for the power supply, such as, on the heat sink of the SCR's. Power for the various amplifiers is supplied by auxiliary DC supplies 56 shown connected to the other circuits over line 55.

With the above general description of the invention in connection with the block diagram of FIG. 1, the description of the invention will continue with detailed descriptions of the various significant functional portions of the invention and in connection with the circuit details of the other figures of the drawing. Identical numbers are used in the various figures to designate the same blocks or components.

Figure 2:
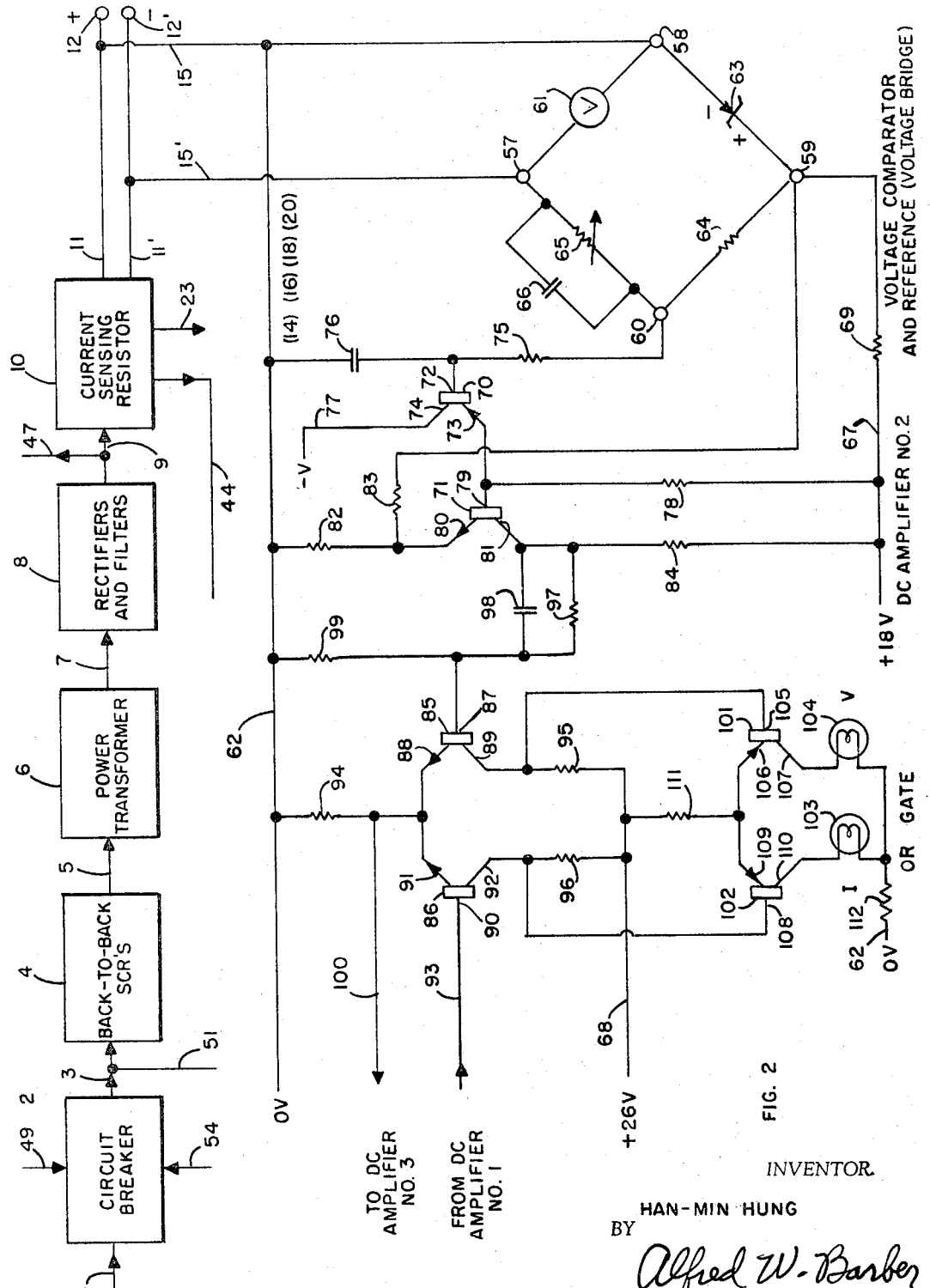
FIGURE 2 is a partly schematic, partly block diagram of a portion of the present invention showing details of the voltage comparator and DC amplifier No. 2 and the gate.

FIG. 2 shows the details of the voltage comparator, reference, DC amplifier No. 2 and OR gate blocks 14, 16, 18 and 20 respectively of FIG. 1. The voltage comparator and reference comprise a circuit often referred to as a comparison bridge which includes arms connected between the four terminals 57, 58, 59 and 60. While the block diagram of FIG. 1 was simplified to the point where, for example, the output lines and terminals were represented by a single line and a single terminal. Actually, of course, this and many of the other lines of FIG. 1 consist of two or more leads or conductors. Thus, in FIG. 2 the output line 11 of FIG. 1 is actually the two conductors 11 and 11' connected to the two output terminals 12 and 12'. Negative conductor 11' is connected by conductor 15' to bridge terminal 57 and positive conductor 11 is connected by conductor 15 to bridge terminal 58. Thus, the output voltage of the power supply is between terminals 57 and 58 and can be measured by voltmeter 61. The reference or zero voltage point of the bridge circuit and its amplifiers is the positive conductors 11 and 15 to which is connected the zero reference conductor 62. The other arms of the bridge include a reference voltage represented as Zener diode 63, a reference resistor 64 and an adjustable output voltage control resistor 65 shunted by a phase leading capacitor 66. The bridge is balanced when the ratio of the output voltage to the reference voltage is equal to the ratio of the control resistor to the reference resistor. The regulating action of the control circuitry to be described below is such that bridge is always maintained substantially balanced. The operating voltages for the circuitry of FIG. 2 is supplied from an auxiliary power supply to be described below which applies suitable voltages such as plus 18 volts to conductor 67 and plus 26 volts to conductor 68. A suitable reference voltage such as 6 volts is maintained between terminals 58 and 59 by a 6 volt Zener diode receiving current from conductor 67 through dropping resistor 69. When the bridge becomes unbalanced, as when the output voltage departs from its regulated value, an error voltage appears between terminal 60 and the zero reference at terminal 58. This error voltage is amplified by a DC amplifier utilizing transistors 70 and 71. The first stage of this amplifier utilizes transistor 70 having a base 72, an emitter 73 and a collector 74 connected in a common collector circuit in order to present a high input impedance. Base 72 receives the error signal from bridge terminal 60 through base current limiting resistor 75 and bypassed by capacitor 76 to remove noise and transient voltages. Collector 74 is returned to a minus 1 volt bias voltage over line 77 and emitter 73 is returned to the 18 volt positive conductor through emitter load resistor 78 thereby providing an output voltage to be applied to the input (base 79) of the second stage transistor 71. Transistor 71 includes base 79, emitter 80 and collector 81 and is connected in a common emitter circuit. Emitter 80 is returned to zero reference conductor 62 through emitter resistor 82 and is provided with a predetermined bias by means of current supplied from the positive end of the reference voltage at terminal 59 as determined by this voltage and the resistance of resistor 83. Collector 81 is returned to the 18 volt positive conductor 67 through collector load resistor 84 thereby providing an amplified output voltage. Thus, the voltage across resistor 84 is the amplified error voltage from the voltage control bridge.

Since the power supply of the present invention is a voltage/current regulated power supply with automatic crossover from one mode to the other, means are provided for determining which mode is in control. These means consist of an OR gate utilizing transistors 85 and 86. One of these transistors receives amplified error signals from the voltage control bridge and the other error signals from the current control bridge (to be described below). The circuit is such that the OR gate provides an output in accordance with whichever is the larger of the two amplified error signals so that the larger one determines the regulating mode of the power supply. Transistor 85 includes a base 87, emitter 88 and collector 89, while transistor 86 includes a base 90, emitter 91 and collector 92. Emitters 88 and 91 are joined together and returned to zero reference conductor through the common resistor 94. Collectors 89 and 92 are returned to the 26 volt positive conductor 68 through collector load resistors 95 and 96 respectively. The amplified voltage control bridge error signal across resistor 84 is applied to base 87 through resistor 97 bypassed by capacitor 98. The initial bias on base 87 is determined by resistor 99 which returns it to zero reference conductor 62 and acts as a voltage divider with resistors 84 and 97. The amplified error signal from the current control bridge is applied over conductor 93 to base 90. The output voltage from this OR gate appears across common emitter resistor 94 and is fed to DC amplifier No. 3 over conductor 100. This output voltage on conductor 100 depends on the amplified error signal of which ever of the voltage or current control bridges predominates at the OR gate inputs and hence determines the mode, current or voltage, of regulation of the power supply.

Coupled to the OR gate are two transistors 101 and 102, which actuate mode indicator lamps 103 and 104, one to show that the power supply is operating in voltage regulating mode and the other to show that it is operating in current regulating mode. Transistor 101 has a base 105, an emitter 106 and collector 107 while transistor 102 has a base 108, an emitter 109 and a collector 110. Emitters 106 and 109 are connected together and through common resistor 111 to 26 volt positive conductor 68. Base 105 is connected to collector 89 so that amplified voltage bridge error signals are applied to it and base 108 is connected to collector 92 so that amplified current bridge error signals are applied to it. Lamp 103, the current mode indicator lamp from collector 110 to zero reference conductor 112 and lamp 104, the voltage mode indicator lamp from collector 107 are connected together to limiting resistor 112 returning to zero reference conductor 62. Thus, whichever of bases 105 and 108 receives the larger amplified error signal will cause its transistor to conduct and the corresponding lamp to light.

Figure 3:
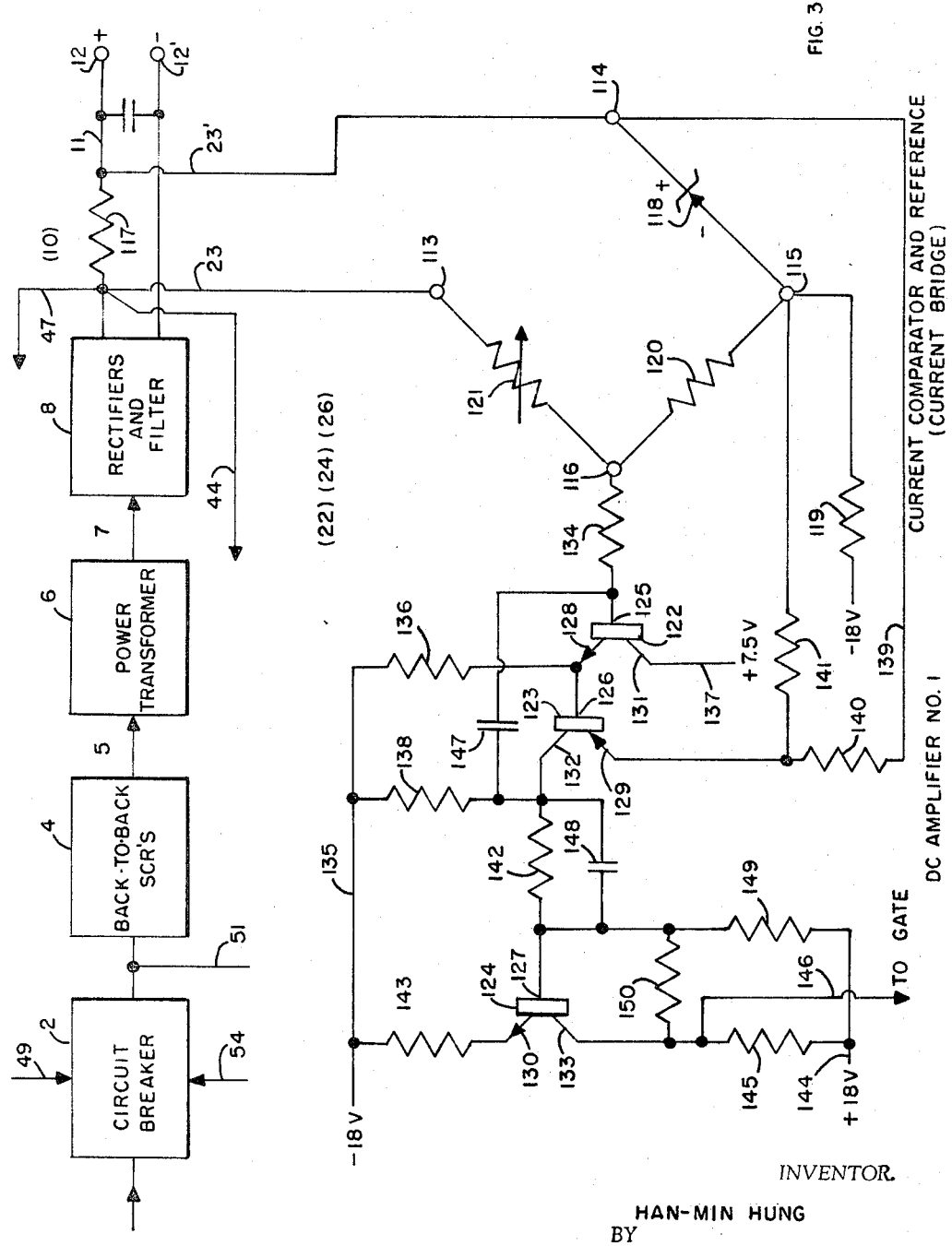
FIGURE 3 is a partly schematic, partly block diagram of a second portion of the present invention showing details of the current comparator and DC amplifier No. 1.

FIG. 3 shows circuit details of the current sensing resistor, the current comparator and DC reference comprising the current control bridge and the current bridge DC error amplifier No. 1 shown in blocks 10, 22, 24 and 26 respectively of FIG. 1. The current control bridge is similar to the voltage control bridge described above and includes four arms connected to the four bridge terminals 113, 114, 115 and 116. The current sensing resistor 117 is connected in series with the positive output lead 11 and between bridge terminals 113 and 114 over conductors 23 and 23' so that it forms one arm of the bridge. Another arm consists of a reference voltage provided by Zener diode 118 receiving current from a minus 18 volt point in the auxiliary power supply through series dropping resistor 119 and connected between bridge terminals 114 and 115. The third arm of the bridge consists of reference resistor 120 connected between bridge terminals 115 and 116. The fourth arm of the bridge consists of current control (adjustable) resistor 121 connected between bridge terminals 113 and 116. This current control bridge is balanced when the ratio of the voltage drop across sensing resistor 117 (due to the power supply output current) divided by the reference voltage 118 is equal to the resistance of the current control resistor 121 divided by the resistance of the reference resistor 120. If the current bridge is not so balanced, an error signal will appear between terminal 116 and zero reference terminal 114 this error signal is amplified and controls the power supply in such a manner as to tend to reduce the error to zero. The current bridge error is amplified by a DC amplifier employing transistors 122, 123 and 124 having bases 125, 126 and 127; emitters 128, 129 and 130; and collectors 131, 132 and 133 respectively. The error signal at bridge terminal 116 is applied to base 125 through base current limiting resistor 134. Transistor 122 is connected as a common collector amplifier or emitter follower with emitter 128 returned to the 18 volt negative conductor 135 through emitter load resistor 136 and collector 131 returned to a 7.5 volt positive conductor 137. The output from transistor 122 is applied to transistor 123 by means of a connection between emitter 128 and base 126. Transistor 123 is operated as a common emitter amplifier with collector 132 returned to 18 volt negative conductor 135 through collector load resistor 138 and emitter 129 returned to zero reference terminal 114 over conductor 139 and through emitter resistor 140. The desired bias on emitter 129 is provided by current from negative terminal 115 of the resistance voltage as determined by resistor 141. Transistor 124 is operated as a common emitter amplifier with input to its base 127 derived from collector 132 through series resistor 142; its emitter 130 returned to 18 volt negative conductor 135 through emitter resistor 143; and its collector 133 returned to 18 volt positive conductor 144 through collector load resistor 145. The current bridge error signal thus amplified and appearing at collector 133 is passed on to the OR gate shown in detail in FIG. 2 over conductor 146. This circuit (FIG. 3) includes lagging capacitors 147 and 148 and a basis network for base 127 including resistors 149 and 150.

Figure 4:
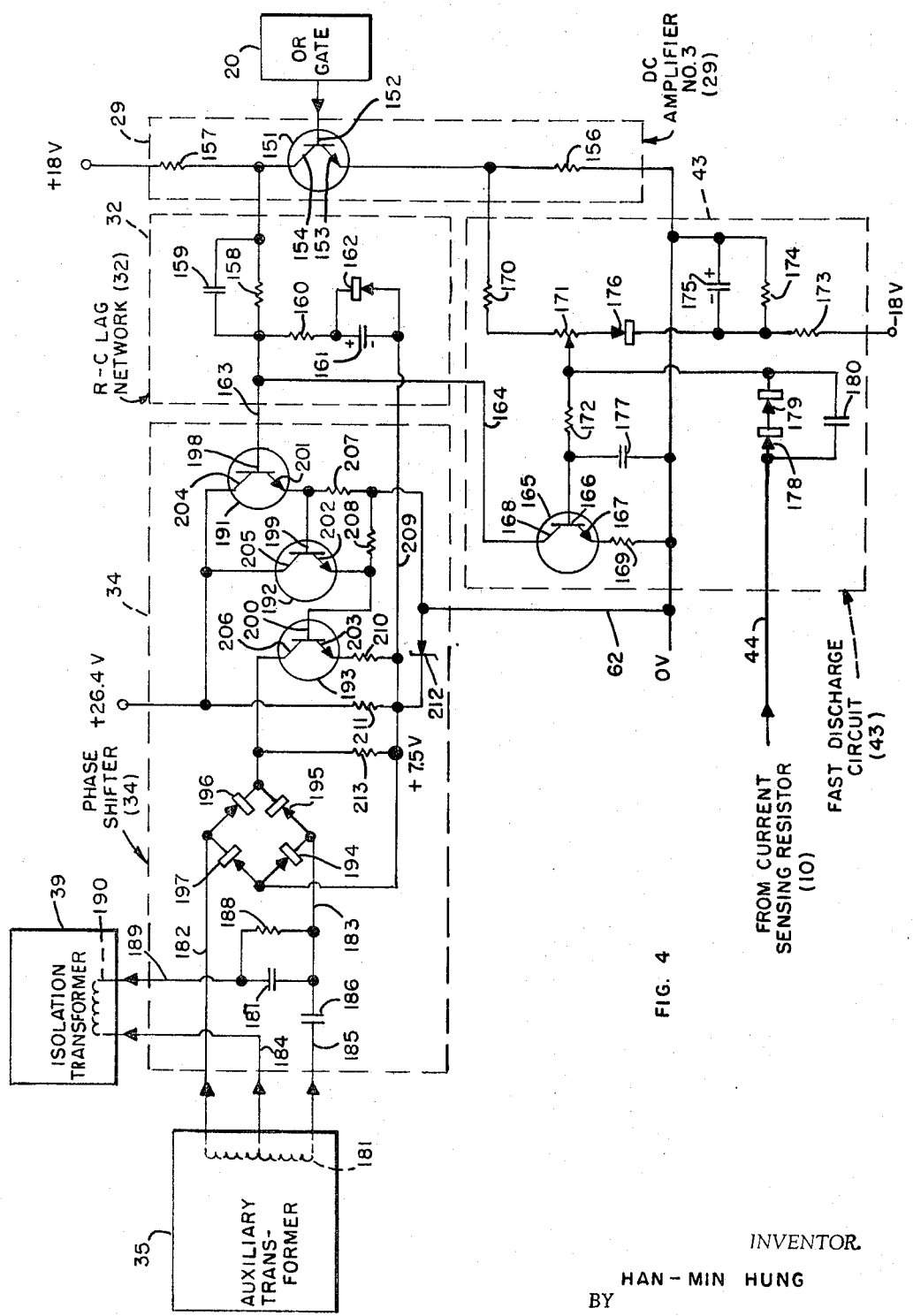
FIGURE 4 is a partly schematic, partly block diagram of a third portion of the present invention showing details of the phase shifter, R-C lag network and fast discharge circuit.

FIG. 4 shows details of the DC amplifier No. 3 R-C lag network, fast discharge circuit and phase shifter represented by blocks 29, 32, 43 and 34 respectively of FIG. 1. The third DC amplifier 29 consists of transistor 151 having a base 152, emitter 153 and collector 154. Emitter 153 is returned zero reference conductor 62 through emitter resistor 156 and collector 154 receives its bias from 18 volts positive through load resistor 157. Input to this amplifier is received from OR gate 20 and is applied to base 152. The amplified output appearing at collector 154 is applied to the R-C lag network 32 which consists of resistor 158 shunted by capacitor 159 in series and the series combination of resistor 160 and capacitor 161 in shunt. This network provides a predetermined fixed lag necessary for stability of the system. The error signals from the R-C lag network are passed on to phase shifter 34 over conductor 163.

Coupled to the R-C lag network 32 over conductor 164 is the fast discharge circuit 43. The active device in this fast discharge circuit is transistor 165 which has a base 166, an emitter 167 and a collector 168. Emitter 167 is returned to zero reference conductor 62 through emitter resistor 169. Base 166 receives input signals from two sources. One source is emitter 153 coupled to base 166 through a voltage divider consisting of fixed resistor 170 and potentiometer 171, and forward biased diode 176 returning to a slightly negative voltage (for temperature compensation) (say 1 volt) derived from 18 volts negative through a divider made up of resistors 173 and 174, the latter being by-passed by capacitor 175. The wiper of potentiometer 171 is connected to a limiting resistor 172 and then to base 166. Base 166 is by passed for high frequency components such as noise by capacitor 177. The second source is by way of conductor 44 from the input end of current sensing resistor 117 (see FIG. 3) through diodes 178 and 179 by-passed by capacitor 180 and through resistor 172. The potentiometer 171 is the adjustment for optimizing the transient response. The function of this fast discharge circuit is to provide a shortcut for discharging the relatively large capacitor 161 of the R-C lag network via a low resistance path consisting of resistor 160, transistor 165 and resistor 169 so that the voltage level applied to the phase shifter will be rapidly adjusted in accordance with the error signal. The fast discharge circuit responds to suddenly increased signals from either of its two inputs which can result from a sudden change in load or AC input. Especially when a short circuit is suddenly applied across the power supply output, a large voltage being developed across current sensing resistor 117 turns on diodes 178 and 179 and so the fast discharge circuit, the conduction angle of SCR's 4 is reduced so fast that the heavy overload at the AC input will be avoided. Without this fast discharge circuit, the circuit breaker will be easily tripped due to overloading. In general, for large error signals, the transistor 165 turns on to provide fast discharge action; whereas for small error signals, capacitor 161 will be discharged through a high resistance path consisting of resistors 160 and 158, transistor 151 and resistor 156. The result is to greatly improve the transient response of the system without sacrifice of stability since under more or less steady state operation or slow changes the R-C lag network has a large time constant for stability purposes and makes the system slow to respond to changes in load or AC input.

The next portion of the circuit is the phase shifter 34 the function of which is to shift the phase of a line frequency voltage in accordance with the amplitude of the amplified error signal applied over conductor 163. Phase shifting as accomplished by varying the resistance between conductors 182 and 183 which controls the AC from one half of secondary 181 of auxiliary transformer 35. The AC from the other half over conductor 185 is connected to the fixed capacitor 186. The phase shifted AC is applied to primary 190 of isolation transformer 39 from center-tap lead 184 and the junction between the resistive and capacitative impedances at conductor 183 through capacitor 187 shunted by resistor 188 and over conductor 189. In order to control the effective resistance between conductors 182 and 183 the amplified error signal at conductor 163 is amplified by transistors 191, 192 and 193 and is applied to a diode bridge rectifier including diodes 194, 195, 196 and 197. Transistors 191, 192 and 193 include bases 198, 199 and 200; emitters 201, 202 and 203; and collectors 204, 205 and 206 respectively. Base 198 receives the amplified error signals over conductor 163. Emitter 201 is returned to zero reference conductor 62 through emitter resistor 207 and drives base 199. Collectors 204 and 205 are connected to the 26.4 volt positive source. Emitter 202 is returned to zero reference conductor 62 through emitter resistor 208 and drives base 200. Thus transistors 191 and 192 operate in a common collector mode and drive transistor 193. Emitter 203 is returned to conductor 209 through emitter resistor 210. Conductor 209 is biased at plus 7.5 volts through dropping resistor 211 connected to plus 26.4 volts and is stabilized at this voltage by means of Zener diode 212 which is connected between conductors 209 and 62. Collector 206 is connected to one diagonal of the diode bridge and conductor 209 to the other and the two are shunted by resistor 213 for determining the maximum resistance which can appear between collector 206 and conductor 209. The operation of the phase shifter takes place through the error controlled collector to emitter resistance of transistor 193. This resistance is unidirectional since transistor 193 conducts only in one direction but is made bidirectional by diode bridge 194, 195, 196, 197 so that the resulting resistance between conductors 182 and 183 is bidirectional and controls both halves of the AC signal applied from auxiliary transformer 35 and hence the phase shifted and phase controlled signal applied to primary 190 of isolation transformer 39.

Figure 5:
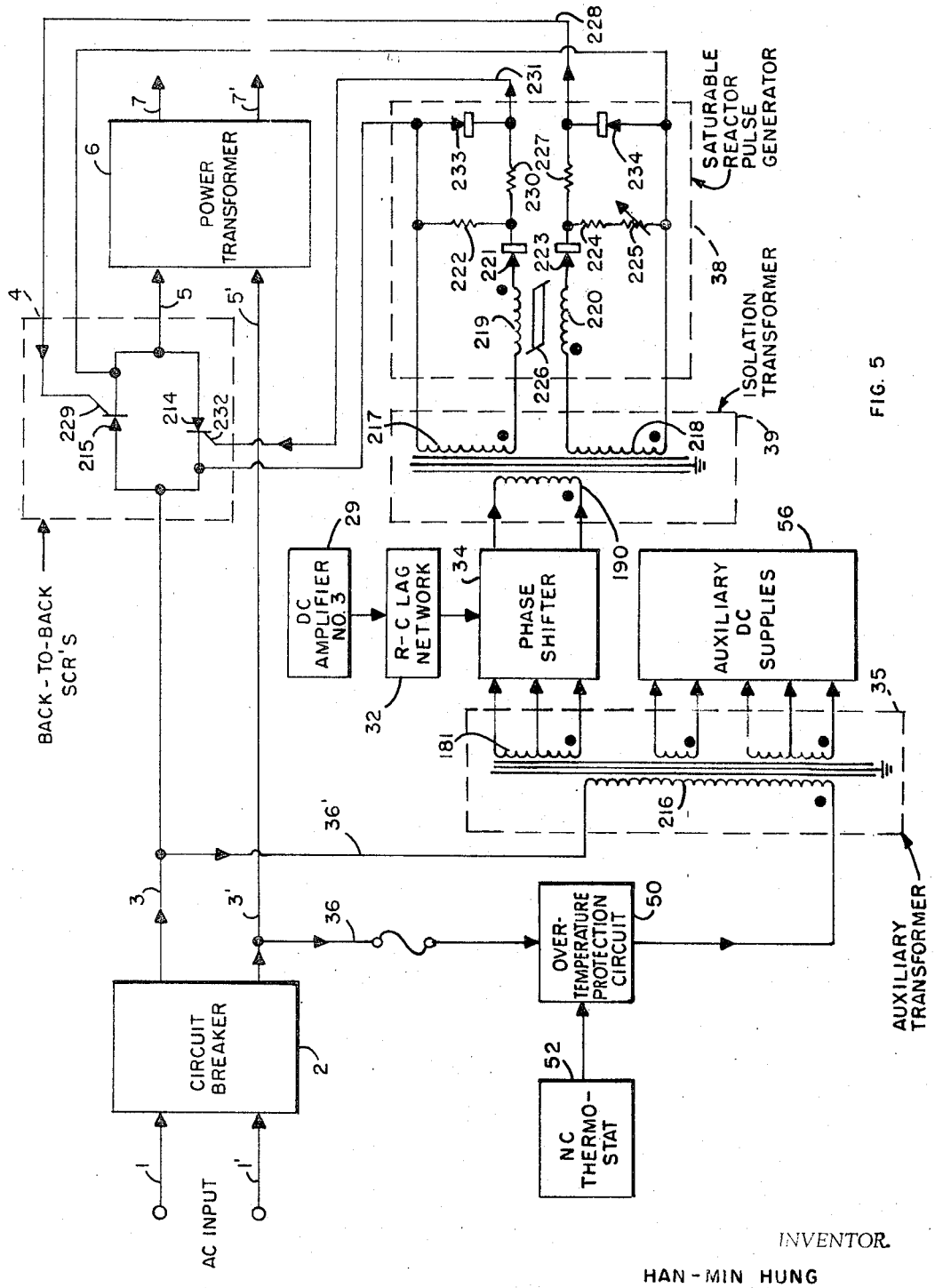
FIGURE 5 is a partly schematic, partly block diagram of a fourth portion of the present invention showing details of the magnetic saturable reactor pulse generator and the back-to-back SCR's.

The next portion of the circuit in order of signal progression is shown in detail in FIG. 5. The details here are of the back-to-back SCR's 4, the saturable reactor pulse generator 38, the isolation transformer 39 and the auxiliary transformer 35. The firing of the SCR's 214 and 215 is accomplished in the following manner. The sinusoidal voltage from the AC lines 1 and 1' passes through circuit breaker 2, over lines 3 and 3' and 36 and 36' and through over-temperature protection circuit 50 to primary 216 of auxiliary transformer 35. Secondary 181 of isolation transformer 39 feeds phase shifter 34 as described above in connection with FIG. 4 and phase shifter 34 feeds phase shifted line frequency signals to primary 190 of isolation transformer 39. The phase-shifted sinusoidal line frequency voltage appears across the dual secondaries 217 and 218. The voltage across secondary 217 is across winding 219 of saturable reactor 219-220, rectifier 221 and bleeder resistor 222. Similarly the voltage of secondary 218 is across winding 220 of saturable reactor 219-220, rectifier 223 and bleeder resistors 224 and 225. During the half-cycle that the potential at the end of secondary 217 which is connected to resistor 222 is higher than its other end, diode 221 is back-biased. Meanwhile the diode 223 is forward-biased so that the voltage from secondary 218 will be across winding 220. As soon as the instantaneous voltage across winding 220 reaches saturation voltage for core 226, this saturation of core 226 in the one direction will produce a positive going pulse across resistors 224 and 225. This positive going pulse is connected through resistor 227, over conductor 228 to gate 229 of SCR 215 causing it to fire. The time of firing will be determined by the phase of the voltage across secondary 218 as controlled by the error signals as provided in phase shifter 34 as described above. During the other half cycle of the sine wave rectifier 223 will be back-biased and rectifier 221 forward-biased and the voltage of secondary 217 across winding 219 will saturate core 226 and reset it. Also a positive going pulse will be generated across resistor 222 which conducted through resistor 230 and over conductor 231 to gate 232 will fire SCR 214 in accordance with the phase controlled signals from phase shifter 34 as set forth above. Rectifiers 233 and 234 provide negative bias on SCR gates 232 and 229 respectively. Resistors 227 and 230 are current limiting resistors to limit the current to the SCR gates. Potentiometer 225 is used to adjust the bleeder current so that the saturation instant can be varied slightly to provide symmetrical firing of the SCR's.

This magnetic pulse generator is an improvement over prior pulse generators used for firing SCR's for at least two reasons. First, the magnetic remanence in the core of the power transformer (see FIG. 6) may last for a long period of time after the power supply is switched off. The magnetic remanence in the core 226 of the saturable reactor 219-220 acts as a memory device, which not only provides the required alternative firing but also prevents the SCR's from turning on during the wrong half-cycle of the AC input i.e., the half-cycle that would drive the core of the power transformer into saturation, even if there are failures in the electronic control circuit such that the "soft start" circuit (to be described below) is not functioning. Therefore this magnetic firing circuit provides the double protection for the costly SCR's from being damaged by the saturation of the power transformer. All electronic firing circuits have to rely entirely on a soft start circuit for such protection and in case of failure of this circuit, damage will almost certainly result.

Secondly, the firing pulse generated by the magnetic firing circuit described above is a wide pulse with a relatively high spike at its beginning guaranteeing that the SCR's will not only fire but will remain in conduction after the spike is past. No such guarantee results from prior art systems such as those using a series of pulses.

Figure 6:
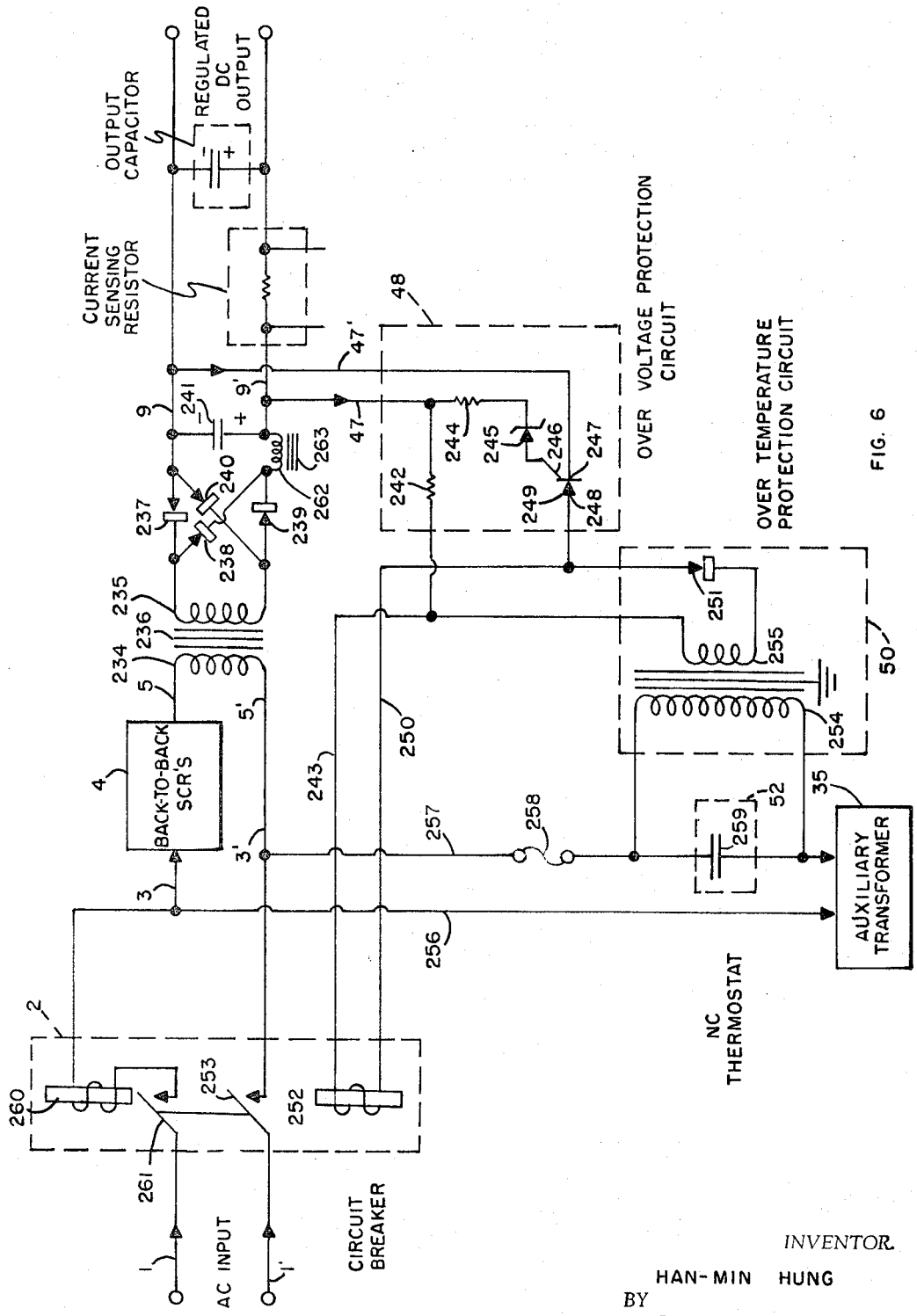
FIGURE 6 is partly schematic, partly block diagram of a fifth portion of the present invention showing details of the circuit breaker, over-voltage and over-temperature protective circuits, the power transformer and the main rectifiers and filter.

Details of the over-voltage and over-temperature protection circuits are shown in FIG. 6 together with details of the power transformer 6, rectifiers and filter 8. The AC from input lines 1 and 1' passes through circuit breaker 2, over lines 3 and 3', through SCR's 4 and over lines 5 and 5' to primary 234 of power transformer 234-235-236. Secondary 235 provides the appropriate voltage to rectifiers 237, 238, 239 and 240 providing direct current on lines 9 and 9' which is filtered by filter inductor 262 and capacitor 241. The DC across lines 9 and 9' is applied over conductors 47 and 47' through resistor 244 and Zener diode 245 to gate 246 and cathode 247 of SCR 249 which form the sensing part of the over-voltage protection circuit. If the DC voltage across lines 9 and 9' at the output of the filter rises above the sum of the regulating voltage of Zener 245 and the gate to cathode forward drop of SCR 249, Zener 245 will conduct passing current to gate 246 and causing SCR 249 to fire and thus become conducting. When this happens, DC current will flow over conductors 47 and 47' through resistor 242 and SCR 249, over conductors 243 and 250 to energize circuit breaker 252 and opening its switch contacts 253 which is mechanically coupled to switch contacts 261 removing power from the input to the power supply. Resistors 242 and 244 are current limiting resistors for limiting the current to the required values in the circuit breaker and SCR gate respectively.

The over-temperature protection circuit includes normally closed thermostatic switch 52, transformer 254-255 and rectifier 251. Thermostatic switch 52 is thermally coupled to the circuit elements to be protected from over-temperature such as SCR's 4. AC power is supplied over conductors 256 and 257 and through fuse 258 and normally closed thermostatic switch 52 to auxiliary transformer 35, which supplies the control circuitry. If the temperature of the protected elements rises above a predetermined point, contacts 259 open and AC voltage from conductors 256 and 257 through auxiliary transformer 35 appears across primary 254 inducing an AC voltage across secondary 255. This secondary voltage is rectified by rectifier 251 and applied over conductors 243 and 250 to circuit breaker 252, opens contacts 253 removing input power from the power supply. When contacts 259 open, the AC line voltage across conductors 256 and 257 is shared between auxiliary transformer 35 and primary 254 which so reduces the input to auxiliary transformer 35 that all the control circuits are disabled and since under these conditions the SCR's will not fire and the over-voltage circuit will not be activated.

An additional protection is provided by circuit breaker 260 in series with the AC input line 1 and which opens contacts 261 in case of conditions which draw excessive line current as would result from breakdown of one of the SCR's 4.

While only one form of the present invention has been shown and described, many modifications will be apparent to those skilled in the art and within the spirit and scope of the invention as set forth in the appended claims.

What is claimed is:

1. In a direct current regulated power supply, the combination of, a power transformer including primary and secondary windings, rectifier and filter means connected to said secondary to provide filtered direct current to output means, two back-to-back silicon controlled rectifiers including gate elements connected to said primary for controlling alternating current from a powerline to said primary, a saturable reactor pulse generator coupled to said gates for controlling the firing of said silicon controlled rectifiers, a source of reference voltage, means for comparing at least a portion of said output voltage with said reference voltage to provide an errors signal in accordance with the difference therebetween, means for amplifying said error signal, a resistance capacitance lag network for delaying said amplified error signal, a signal responsive phase shifter coupled to receive an alternating current voltage from the silicon controlled rectifiers connected power line, means for applying said delayed amplified error signal to said phase shifter to phase shift the alternating current voltage applied thereto to provide an alternating current voltage phase controlled by said delayed error signal and means for applying said phase controlled alternating current to said saturable reactor pulse generator for controlling the timing of said pulses in accordance with the phase controlled alternating current whereby the firing of said silicon controlled rectifiers controls the direct current output of said power supply.

2. A direct current regulated power supply as set forth in claim 1 and including voltage responsive means for substantially reducing the lag time of said lag network.

3. A direct current regulated power supply as set forth in claim 1 and including current sensing means in series with said output means for developing a voltage proportional to the sensed current, a second source of reference voltage, means for comparing said current developed voltage with said reference voltage to provide a second error signal in accordance with the difference therebetween, means for amplifying said second error signal, an OR gate for comparing the two amplified error signals and for passing the larger of the two to said lag network for controlling said phase shifter.

4. A direct current regulated power supply as set forth in claim 1 and including a circuit breaker interposed between said silicon controlled rectifiers and said power line and over voltage sensing means coupled between said output means and said circuit breaker to open said circuit breaker in response to over voltage conditions in said output means.

5. A direct current regulated power supply as set forth in claim 1 and including over temperature responsive means, coupled to temperature sensitive means within said power supply, a circuit breaker, and coupling means between said temperature responsive means and said circuit breaker for actuating said circuit breaker in response to over temperature conditions of said temperature sensitive means.

6. A direct current regulated power supply as set forth in claim 3 and including current and voltage mode signal means coupled to said OR gate responsive to the condition of said gate.

7. A direct current regulated power supply as set forth in claim 2 wherein said voltage responsive means includes a transistor.

References Cited

UNITED STATES PATENTS 3,289,069 11/1966 Todd _____ 321—18
3,337,773 8/1967 McKenna et al. _____ 317—33

JOHN F. COUCH, Primary Examiner.

WARREN E. RAY, Examiner.

W. H. BEHA, Assistant Examiner.